Figure 1:
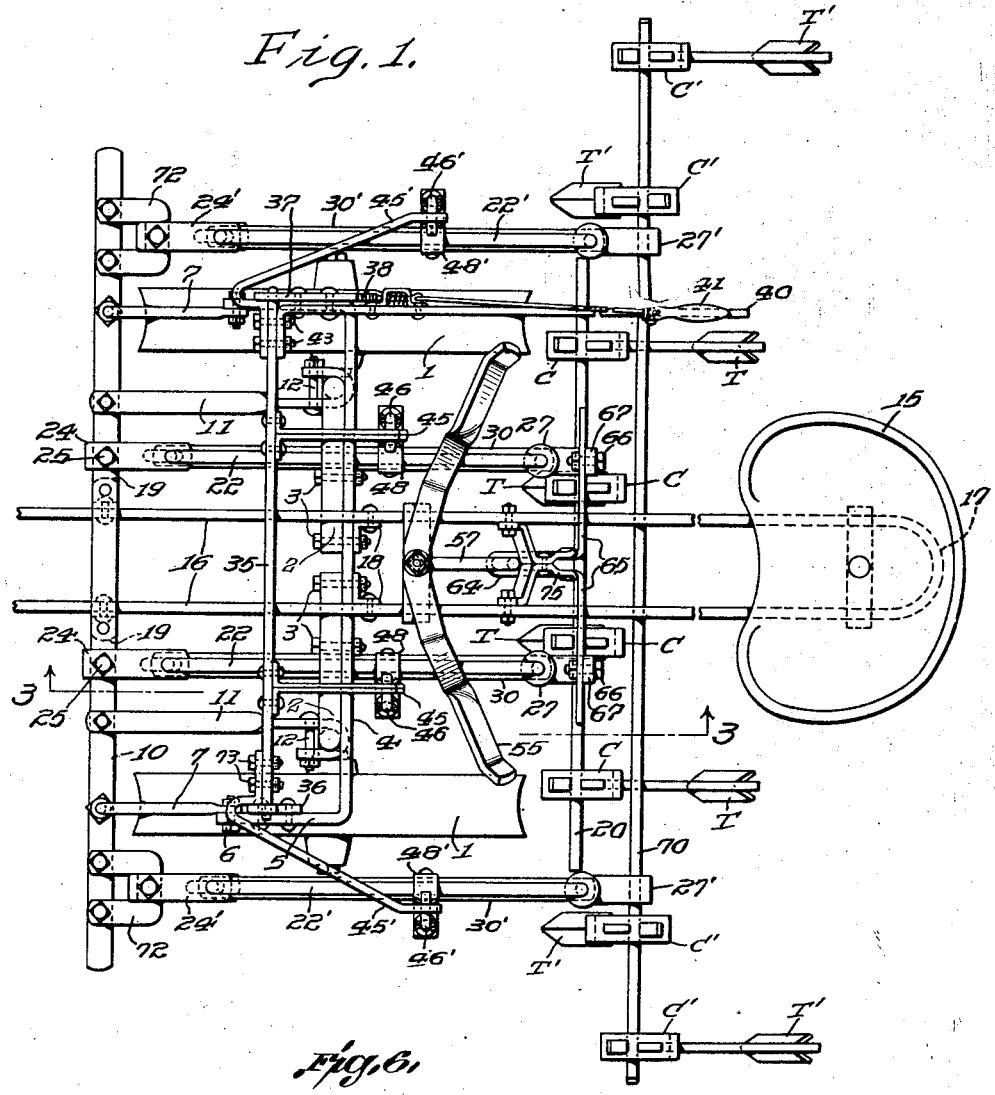
Figure 6:
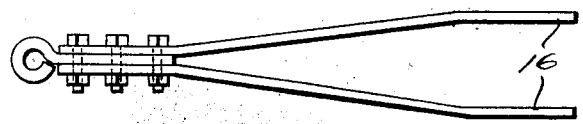

April 13, 1926.

J. MADER 1,580,263

CULTIVATING IMPLEMENT

Filed July 20, 1921    2 Sheets-Sheet 1

WITNESS
F. J. Hartman.

INVENTOR
Joseph Mader.
BY
ATTORNEYS

April 13, 1926. 1,580,263
J. MADER
CULTIVATING IMPLEMENT
Filed July 20, 1921 2 Sheets-Sheet 2
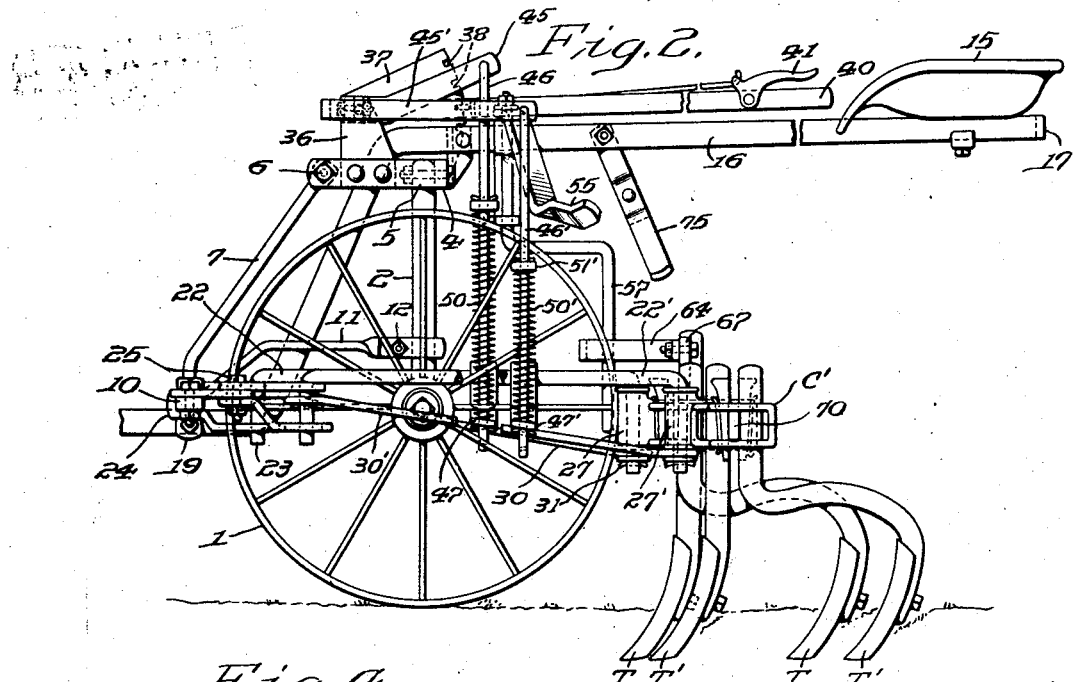
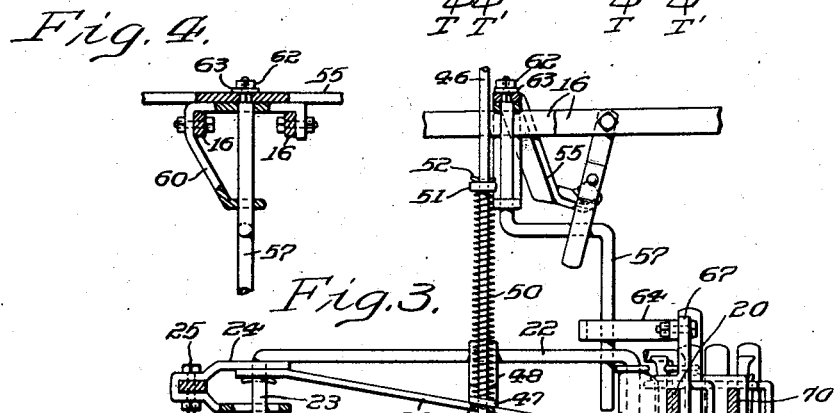
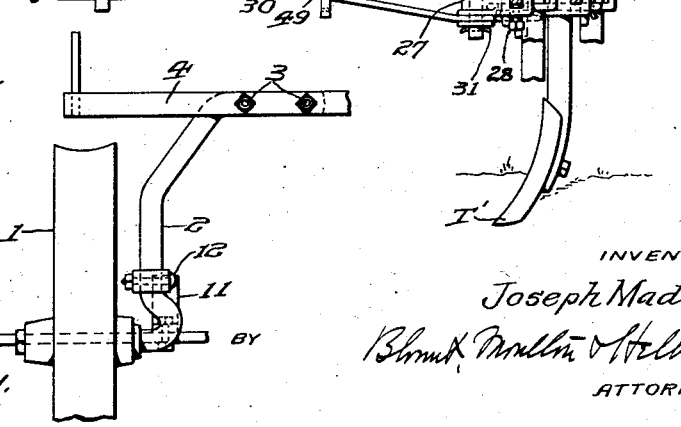
INVENTOR
Joseph Mader.
WITNESS
F. J. Hartman.
BY
ATTORNEYS Patented Apr. 13, 1926.

1,580,263

UNITED STATES PATENT OFFICE.

JOSEPH MADER, OF PHILADELPHIA, PENNSYLVANIA, ASSIGNOR TO S. L. ALLEN & CO. INC., A CORPORATION OF PENNSYLVANIA.

CULTIVATING IMPLEMENT.

Application filed July 20, 1921. Serial No. 486,088. REISSUED

*To all whom it may concern:*

Be it known that I, JOSEPH MADER, a citizen of the United States, and a resident of Philadelphia, county of Philadelphia, State of Pennsylvania, have invented certain new and useful Improvements in Cultivating Implements, of which the following is a specification, reference being had to the accompanying drawings.

My invention relates more particularly to riding cultivators of relatively small size, primarily intended for use in connection with the small tractors, commonly known as garden tractors, which are coming into general use for light agricultural and general farming operations, a principal object of the invention being to provide a riding cultivator adapted for employment with a tractor of the character aforesaid, which shall be simple in construction, effective for the purposes intended and which shall embody such capacity for adjustment and control, more particularly of the cultivating or other tools utilized, as shall render it readily adaptable for service under varying conditions and permit its ready manipulation and operation in different sorts of agricultural work.

Further objects of my invention are to provide a riding cultivator having a transversely extending gang bar for supporting the cultivating or other ground working tools and embodying foot-operative means for effecting lateral displacement of the gang bar substantially transversely to the line of draft of the cultivator to thereby enable the operator to follow the rows of plants very closely with the ground working tools without changing the general direction of movement of the cultivator and also embodying means whereby the gang bar is enabled to adjust itself to inequalities in the ground surface so that at all times the depth or cut of the several ground working tools is substantially constant irrespective of such inequalities.

Still further objects of the invention comprise the provision in a cultivator of the character aforesaid of an additional or auxiliary gang bar and means for supporting and controlling the same, said bar being of sufficient length to extend laterally beyond the main gang bar for the purpose of supporting additional ground working tools whereby a greater area may be cultivated during a single passage of the machine than might otherwise be the case; and said auxiliary gang bar being arranged and supported for independent vertical movement with respect to the main bar and for lateral substantially horizontal movement in correspondence therewith, whereby the auxiliary bar is free to adjust itself to any inequalities in the ground surface in a manner substantially similar to the main bar so that several ground working tools supported by the auxiliary bar are also operative at all times to enter the ground to a substantially constant depth.

A still further object of the invention is to provide a single manually operable means whereby the main and the auxiliary gang bars may be lifted vertically when desired so as to withdraw all of the ground working implements from the ground to enable the machine to be turned or for other purposes, said means being also effective to adjust the vertical height of the gang bars and in turn of the ground working implements so as to regulate the depth of cut of the latter to a nicety.

The invention further contemplates the simplification of riding cultivators of this general character and the construction and arrangement of the several parts in such manner so as to provide a strong simple, practical machine, not liable to get out of order or be damaged in use, and which may be readily attached to or detached from garden tractors or other suitable sources of motive power. Additionally, the invention includes all of the other novel objects and various features of construction and arrangement hereinafter more definitely specified and described.

In the accompanying drawings I have illustrated a preferred embodiment of my invention, Fig. 1 being a partially fragmentary top plan view thereof and Fig. 2 showing the machine in side elevation with the cultivating tools extending into the ground to about the depth ordinarily employed in cultivating operations, certain parts of the machine being broken away for the sake of clearness. Fig. 3 is a fragmentary detail view on line 3—3 in Fig. 1 looking in the direction of the arrows; Fig. 4 is a fragmentary elevation, partially in vertical section, of one of the details of the device, Fig. 5 is a fragmentary front elevation of one of the wheels and its supporting axle, and Fig.

6 is a fragmentary top plan view of the extreme forward end of the machine. Like numerals are used to designate corresponding figures in the several views.

Referring now more particularly to the drawing, the form of the invention shown therein comprises pair of ground wheels 1 each rotatably mounted on an axle 2, which from the inner side of each wheel is curved upwardly and inwardly and rigidly secured by bolts 3 to a transversely extending horizontally positioned frame member 4. The ends 5 of this member are directed forwardly and to each of them is secured by a bolt 6, a downwardly and forwardly extending strut 7 the lower end of which passes through and is bolted to a transversely extending draft bar 10 positioned parallel to the member 4 and considerably in front of and below the same.

In order to increase the rigidity of the structure, braces 11 are arranged to extend from the draft bar rearwardly to each axle around which they are bent and secured in position by bolts 12, thus very securely tying member 4, draft bar, and axles together.

For supporting the operator's seat 15 and also for affording convenient means for connecting or hitching the cultivator to the tractor or other source of motive power, a pair of longitudinally extending, laterally spaced rails 16 are provided conveniently formed of a single piece of bar steel bent upon itself at its center 17 and disposed with its greatest width in the vertical plane. From their rearmost extremity 17, the rails extend substantially horizontally forward, one on each side of the center line of the machine, to rest on the upper edge of the member 4 from which point they are directed forwardly and downwardly to pass beneath the draft bar, thence forwardly for a convenient distance and then angularly inward into proximity with each other to provide a convenient point for the attachment of the hitching means employed, which may be of any convenient form, for example, as disclosed and claimed in my pending application for U. S. Letters Patent Serial No. 451,721, filed March 12, 1921. Each of the rails is secured to the member 4 by a suitable clip 18 bolted or riveted both to the member and to the rail and also by a similar clip 19 to the draft bar, the operator's seat 15 being supported adjacent the rear ends of the rails.

For the purpose of supporting a plurality of suitable ground working tools T, a main draft bar 20 is arranged in the rear of the member 4 substantially in the horizontal plane of the draft bar 10 and connected with the latter through the medium of a pair of draft rods 22 positioned one on each side of the central line of the machine, the forward end of each of these rods being turned vertically downward as at 23 to extend through suitable apertures in a draft clip 24. This clip is conveniently formed from a strip of flat steel bent so as to pass around the draft bar 10, to which it is secured by a bolt 25, and to provide a pair of rearwardly extending vertically spaced arms in which are disposed the apertures referred to. The aperture in the upper arm is only slightly greater in diameter than the diameter of the draft rod so that the latter will fit fairly loosely therein, while the aperture in the lower arm is elongated longitudinally so as to permit the lower end of the vertically extending portion of the draft rod to move to and fro therein as the rear end of the rod is raised or lowered, the construction of this clip being most clearly shown in Fig. 3. The rear end of each of the draft rods is also turned vertically downward and extends through a suitable bore formed in a socket 27 which carries a rearwardly extending flange or lug provided with an aperture for the passage of the gang bar 20 to which the socket is adjustably secured by a set screw 28 or in any other convenient manner, the rod being freely rotatable in the socket.

In order to tie the respective ends of each draft rod together and resist the tendency to straighten out the bends in the rods when the ground working tools T are moving through the soil suitable means are provided, preferably comprising a link 30 provided near each end with a hole suitable for the passage of the adjacent end of the rod, the link being arranged to extend from the front turned down portion of the rod adjacent the under side of the upper arm of the draft clip to the rear turned down end of the rod which projects below the socket 27, cotter pins 31 passing through the rods serving to retain the link in place.

It will be understood that the ground working tools T are adjustably supported on the gang bar by suitable clamps C, which may be of any convenient design and preferably of such construction that the shanks of the tools may be clamped to the bar at any desired vertically adjusted height.

Suitable means are provided for effecting vertical support of the draft rods and in turn of the gang bar and also manual vertical adjustment thereof, said means comprising a transversely positioned shaft, manually operable means for effecting partial rotation of the shaft and means extending from the shaft to each of the draft rods whereby the axial rotation of the shaft is operative to raise and lower the draft rods simultaneously. More specifically, a shaft 35 extends transversely of the machine preferably in front of and above the member 4, the left hand end of the shaft being journaled in a vertically positioned plate 36, riveted to the forwardly extending end 5 of the member 4, the opposite, or right hand end of the shaft being similarly journaled in a plate 37 secured in like manner to the end 5 of the member 4 on that side of the machine, this plate being extended rearwardly and provided with notches 38 for the engagement of a suitable detent carried by the rearwardly extending hand lever 40 and operated by a latch 41 in the well-known manner, the rear end of this lever terminating at a point convenient for manual operation by the operator when seated on the seat 15. Preferably this lever is formed from a bar of metal which at its forward extremity is turned inwardly at right angles to its main portion and secured, as by bolts 43, to the shaft 35 the latter being conveniently in the form of a square bar with its ends turned down to rotatably engage in the plates 36 and 37. Thus vertical movement of the lever is effective to rotate the shaft on its axis while by engagement of the detent in the notches 38 the lever and in turn the shaft may be maintained in any desired adjusted position.

Substantially above each of the draft rods 22 is a rearwardly extending arm 45 rigidly riveted or otherwise secured to the shaft 35 so as to move therewith and from a point adjacent the rear end of each of these arms a hanger rod 46 depends loosely downward and extends through a lug 47 formed on a suitable clip 48 clamped to the adjacent draft rod 22, a cotter pin 49 extending through the lower end of the hanger rod beneath the lug serving to prevent the former from being drawn through the latter. For the purpose of continually forcing the draft rod and in turn the gang bar and ground working tools downwardly, a coil spring 50 is disposed between the upper side of the lug 47 and a collar 51 positioned on the rod and retained in place by a cotter pin 52.

In order to effect lateral movement of the gang bar with respect to the frame of the machine, suitable foot operative means are provided, preferably comprising a substantially transversely extending foot lever 55, bent so as to afford convenient foot rests adjacent its extremities and having a central substantially horizontal portion provided with a squared aperture adapted to engage over the correspondingly squared upper extremity of the shift lever 57. This lever is preferably formed from a round bar bent so as to extend vertically downward from its squared upper extremity, thence horizontally rearward and thence vertically downward, the first mentioned portion of the lever passing through vertically aligned apertures in a supporting bracket 60, one part of which extends over the rails 16 and is bolted thereto, its upper surface forming a support for the foot lever 55, and another portion extending angularly downward from one of the rails and thence horizontally for the passage of the shift lever as best shown in Fig. 4, the arrangement being such that the lever is capable of rotation under the influence of the foot lever about the axis of the portion passing through the supporting bracket 60. A nut 62 threaded on the upper end of the shift lever above the foot lever and bearing against a washer 63 positioned between the nut and the foot lever suffices to prevent the shift lever from dropping out of the bracket 60.

The other downwardly extending portion of the shift lever extends loosely through a horizontally positioned U-shaped member or strap 64, the ends 65 of which are turned laterally outwardly in opposite directions and respectively secured by bolts 66 to a lug 67 formed on the adjacent socket 27 and extending upwardly therefrom for a suitable distance, the arrangement being such that partial rotation of the shift lever by means of the foot lever 55 about the axis of that portion of the shift lever supported in the bracket 60 is effective to bring the other end of the shift lever against one side or the other of the strap 64 to push the gang bar and its attached parts laterally towards that side of the machine at which the power has been applied to the foot lever, thus enabling the operator by a suitable movement of his feet to shift the gang bar and the tools carried thereby to the right or left with respect to the frame of the machine so as to cause the tools to follow the rows being cultivated without changing the general direction of movement of the cultivator or of the tractor by which it is being drawn.

It is of course desirable to employ as long a gang bar as possible in order to support a sufficient number of tools to effect the cultivation of the maximum number of rows at a single passage of the machine, but it is found, however, that when a single relatively long gang bar is utilized, inequalities in the ground surface tend to cause the several tools to cut at uneven depths which is inimical to proper cultivation, even though the bar be supported in such manner as to permit its ends to rise and fall independently.

I have found, however, that by providing an auxiliary, independently vertically movable gang bar of considerably greater length than the main gang bar and attaching the tools for the cultivation of the outermost rows thereto, it is possible to effect satisfactory cultivation of a relatively wide area without the difficulties which practically prevent the utilization of a single bar of equal width, and carrying all of the requisite tools. Additionally, I so construct and arrange the various elements that the operator of the machine is enabled through the medium of the foot lever 55 to effect simultaneous lateral movement of both the main and gang auxiliary bars as well as to raise and lower the same simultaneously through manipulation of the hand lever 40. The auxiliary gang bar is however, so supported as to be able to accommodate itself to local irregularities in the ground surface adjacent the several tools which it carries independently of any movement of the main gang bar caused by similar local irregularities in the vicinity of its tools or by the motion of the cultivator wheels and frame so that the several tools carried by both bars are operative at all times to cut to a substantially similar depth and thus effect satisfactory cultivation.

To these ends I therefore provide an auxiliary gang bar 70 disposed slightly in the rear of the main gang bar 20 and of a length to extend beyond the ends thereof on each side of the machine for a sufficient distance to support a suitable number of ground working tools T' through the medium of clamps C', said tools being preferably positioned on the bar adjacent its extremities and outside of the tools carried by the main bar. For imparting draft to the auxiliary gang bar a plurality, for example two, draft rods 22' having downwardly turned ends are employed and preferably located slightly outside of the ends of the main gang bar, these draft rods engaging at their forward ends in draft clips 24' substantially similar to the draft clips 24 already described. These clips may be attached directly to the draft bar 10 adjacent its outer extremities or to supports 72 bolted to that bar as shown in the drawings. At their rear ends the draft rods 22' are turned downwardly and are arranged to engage in sockets 27' carried by the auxiliary gang bar, while the ends of the respective rods are connected by suitable angularly extending links 30' in a manner substantially similar to that described in connection with draft rods 22. The position of the supports 72 and of the sockets 27' is preferably such that draft rods 22' will extend substantially parallel to the draft rods 22, all of these several rods being preferably of substantially the same length, and the several parts being so designed that the ends of the main gang bar 20 will abut against the sockets 27' as clearly shown in Fig. 1, with the result that lateral movement communicated to the gang bar 20 from the foot lever 55 will be communicated, through the contact of that bar with the sockets, to the auxiliary bar 70 so that the two bars are constrained to move laterally in substantial unison and parallelism.

For the purpose of vertically supporting the draft rods 30' a pair of arms 45' are provided and respectively secured at their inner ends adjacent the outer ends of the shaft 35 conveniently by bolts 43 and 73, the arms being thence extended angularly outward and rearward to terminate at a convenient point substantially above the draft rod 22'. From the rear end of each arm a hanger rod 46' depends loosely downward and extends through a lug 47' on a clip 48' carried by the adjacent draft rod in a manner similar to that described in connection with the clips 48 and adjacent parts, a spring 50' surrounding the rod and positioned thereon by collar 51' serving to force the draft rod and in turn the auxiliary gang bar downwardly at all times and thus tend to maintain in the ground the ground working tools mounted on the gang bar in the vicinity of the point at which the adjacent draft rod is attached. However, in case any of the tools should strike a rock or other obstruction, the tool and adjacent parts are free to move upwardly momentarily against the compression of the spring and thus permit the tool to ride over the obstruction without injury.

It will thus be observed that by reason of the utilization of main and auxiliary gang bars each supported for independent vertical movement and by positioning the tools intended for cultivation of the central rows on the main gang bar and those intended for the cultivation of the outlying rows on the auxiliary gang bar, the several tools are free to rise and fall locally in accordance with the inequalities of the ground in their respective vicinities, the springs 50 and 50' at all times assisting the force of gravity in keeping the tools in the ground at the maximum depth permitted by the adjustment of the hand lever 40, while allowing the tools to lift momentarily when necessary to pass over an obstruction. Additionally, the operator by suitable movement of the foot lever 55 is enabled to shift both gang bars substantially simultaneously to the right or left to cause the tools to follow the rows, and when the end of the row is reached or for some other reason it is desired to lift the tools from the ground, all of them may be simultaneously raised by movement of the hand lever 40, which through the shaft 35 is operative to lift both the arms 45 and 45' and in turn all of the draft rods and gang bars at the same time, while the vertical adjustment of the gang bars and in turn the tools carried thereby may be varied as desired during operation by engaging the detent on the lever 40 with any desired notch in the plate 37.

It will be further observed that the auxiliary gang bar together with its supporting mechanism and the draft rods 22' may be readily removed from the machine in case it be desired to utilize the latter for the cultivation of a relatively narrow area and that the said parts may be as readily replaced when required.

As under certain circumstances it may become desirable to retain the gang bars in central position, a fork 75 may be arranged below the rails to which it is hinged on a horizontal pivot in such manner that it may be swung down to engage the shift lever as shown in Fig. 3, to hold the same stationary and thus prevent lateral movement of the gang bars; under ordinary conditions of operation, however, this fork is swung up out of engagement with the shift lever, as shown in Fig. 2, to permit movement of the latter as hitherto described.

While I have herein described and illustrated with considerable particularity a preferred embodiment of my invention, I do not thereby desire or intend to limit myself to any precise details of construction and arrangement of the various parts as the same may be modified and varied in minor particulars and by the utilization of other forms of tools than those shown the machine may be readily adapted for agricultural operations other than cultivating without departing from the spirit and scope of the invention as defined in the appended claims.

Having thus described my invention I claim and desire to protect by Letters Patent of the United States:

1. In a machine of the class described, the combination of a frame, ground wheels and supporting means extending between said frame and said wheels, a draft bar rigidly positioned in front of and below said frame, a plurality of independent substantially parallel tool-carrying gang bars positioned one behind the other in rear of and below said frame, a plurality of draft rods extending between said draft bar and one of said gang bars, a plurality of draft rods extending between said draft bar and the other of said gang bars, foot operative means for effecting simultaneous lateral movement of said gang bars with respect to said frame and manually operable means adapted to raise and lower said gang bars simultaneously irrespective of the laterally shifted position thereof.

2. In a machine of the class described, the combination of a frame, ground wheels and supporting means extending between said wheels and said frame, a horizontally positioned draft bar rigidly supported in front of and below said frame, a pair of vertically independently movable main and auxiliary tool-carrying gang bars positioned in substantial parallelism in rear of and below said frame, a plurality of independently movable draft rods extending between said draft bar and each of said gang bars, foot controlled means comprising a transversely extending foot lever and a shift lever rotatable on a vertical axis operative to directly effect lateral shifting of said main gang bars with respect to said frame, and means carried by the auxiliary gang bar and in engagement with said main bar whereby lateral movement of said main bar is transferred to said auxiliary bar to shift the same in correspondence with the movement of said main bar.

3. In a machine of the class described, the combination of a frame, ground wheels and supporting means extending between said wheels and said frame, a horizontally positioned draft bar rigidly supported in front of and below said frame, main and auxiliary vertically independently movable tool-carrying gang bars positioned in substantial parallelism in rear of and below said frame, a plurality of independently movable draft rods extending between said draft bar and on each of said gang bars, foot controlled means, comprising a transversely extending foot lever and a shift lever rotatable on a vertical axis, operative to directly effect lateral shifting of said main gange bars with respect to said frame and means carried by the auxiliary gang bar and in engagement with said main bar whereby lateral movement of said main bar is transferred to said auxiliary bar to shift the same in correspondence with the movement of said main bar, and manually operable means for simultaneously raising or lowering both of said gang bars.

4. In a machine of the class described and the combination of a frame, ground wheels and axles extending between said wheels and said frame, a horizontally positioned draft bar rigidly supported in front of said frame, a pair of vertically independently movable tool-carrying gang bars positioned in substantial parallelism in rear of said frame, a plurality of independently movable draft rods extending between said draft bar and each of said gang bars, foot controlled means, comprising a transversely extending foot lever and a shift lever rotatable on a vertical axis, operative to directly effect lateral shifting of one of said gang bars with respect to said frame and means carried by the other gang bar and in engagement with said first mentioned bar, whereby lateral movement of said latter bar is transferred to the other bar to shift the same in correspondence with the movement thereof, and manually operable means comprising a single hand lever, a transversely extending shaft and means connecting said shaft with each of said draft rods for simultaneously raising and lowering both of said gang bars.

5. In a machine of the class described, the combination of a frame, ground wheels and means for supporting said frame above said wheels, a draft bar positioned in front of and below said frame, an operator's seat in rear of said frame and means for supporting said seat comprising a pair of rails secured to and extending rearwardly from said frame, said rails also extending downwardly and forwardly to said draft bar and thence forwardly to afford means for connecting said machine to a source of motive power.

6. In a machine of the class described, the combination of a horizontally positioned frame, ground wheels and means for supporting said frame above said wheels, a draft bar positioned in front of and below said frame, a pair of laterally spaced rails extending substantially horizontally rearwardly from said frame and also downwardly and forwardly from said frame to said draft bar, and thence forwardly from said bar to afford a point of attachment for the machine to a source of motive power and an operator's seat supported adjacent the rearmost extremities of said rails.

7. In a machine of the class described, the combination with a frame, ground wheels and means for supporting said frame therefrom, of a draft bar positioned in front of said frame, a main and an auxiliary tool-carrying gang bar positioned behind said frame, movable draft means extending between said draft bar and said gang bars, means for effecting lateral movement of the main gang bar with respect to the frame comprising a substantially transversely extending foot lever and shift lever movable with said foot lever on a vertical axis, and a U-shaped horizontally extending member loosely surrounding a free end of said shift lever and rigidly secured to said main gang bar and means carried by said auxiliary gang bar and engaging said main gang bar whereby lateral movement of said main gang bar is communicated to said auxiliary bar to cause said main and auxiliary gang bars to move in unison when said foot lever is operated.

8. In a machine of the class described, the combination with a frame, ground wheels and means for supporting said frame therefrom, of a draft bar positioned forward of said frame, a main gang bar and an auxiliary gang bar arranged in substantially horizontal relation behind said frame, movable draft means extending between said respective gang bars and said draft bar, means for effecting lateral movement of the main gang bar with respect to the frame comprising a foot lever, a shift lever movable therewith on a vertical axis and a member loosely engaging a free end of the shift lever and rigidly secured to the main gang bar, means carried by the auxiliary gang bar and engaging the main gang bar, whereby lateral movement of the latter is communicated to the auxiliary bar, and manually operable means supported adjacent said frame and connected with said draft means adapted to raise and lower both gang bars simultaneously irrespective of their laterally shifted position.

9. In a machine of the class described, the combination of a horizontally disposed frame member, ground wheels and means for supporting said member above said wheels, a draft bar positioned in front of and below said frame member substantially in horizontal alignment with the axis of rotation of the wheels, laterally spaced rails extending substantially horizontally rearward from said frame member and downwardly and forwardly from said frame member to said draft bar, and an operator's seat supported on the horizontally extending portion of said rails.

10. In a cultivating implement the combination of a horizontally disposed frame member, ground wheels and means for supporting said member above said wheels, a draft member rigidly positioned in front of and below said frame member substantially in horizontal alignment with the axis of rotation of the wheels, movable draft rods extending rearwardly from said draft member, a transversely extending gang bar connected with said rods, laterally spaced rails supported on said frame member and extending horizontally rearwardly and angularly forwardly and downwardly therefrom and secured to said draft member, an operator's seat supported on the horizontal portion of the rails, foot controlled mechanism for shifting said gang bar laterally, and manually operable mechanism for raising and lowering the gang bar irrespective of its shifted position.

11. In a cultivating implement the combination of a frame member, ground wheels, means for supporting the wheels below the frame member, a draft bar positioned in front of the frame member substantially in horizontal alignment with the centers of said wheels, laterally spaced rails secured to the draft bar and extending rearwardly upwardly therefrom and over said frame member, an operator's seat supported on said rails, a transversely extending gang bar in the rear of said draft member and in substantial horizontal alignment with the draft bar, means connecting said draft bar and said gang bar relatively horizontally movable with respect to each of said bars, and means for shifting said gang bar laterally with respect to the draft member.

12. In a cultivating implement the combination of a frame member, ground wheels and means for supporting said member above said wheels, a laterally extending draft bar positioned in front of and below said frame member substantially in horizontal alignment with the centers of said wheels, means extending between said draft bar and said supporting means operative to maintain the draft bar in fixed position with respect thereto, rails extending upwardly and rearwardly from the draft bar and over the frame member and adapted to support an operator's seat in the rear of said frame member, a laterally extending and laterally movable gang bar in substantially horizontal alignment with said draft bar, horizontally movable draft means connecting said gang bar with said draft bar, foot controlled means for effecting lateral movement of the gang bar, and means for vertically supporting said draft means.

In witness whereof, I have hereunto set my hand this 19th day of July, A. D. 1921.

JOSEPH MADER.